United States Patent
Yoder

[11] 3,746,421
[45] July 17, 1973

[54] MULTIPLE LINE ROTATING POLYGON
[75] Inventor: John R. Yoder, Westport, Conn.
[73] Assignee: Barnes Engineering Company, Stamford, Conn.
[22] Filed: Oct. 27, 1971
[21] Appl. No.: 192,814

[52] U.S. Cl. .................... 350/6, 350/285, 350/286, 356/203, 250/236
[51] Int. Cl. ............................................ G02b 17/00
[58] Field of Search ............... 356/203, 158; 350/6, 350/285, 286; 250/236; 178/7.6

[56] References Cited
UNITED STATES PATENTS
3,482,102  12/1969  Thomas .............................. 250/236

—Ronald L. Wibert
*Assistant Examiner*—Paul K. Godwin
*Attorney*—Joseph Levinson et al.

[57] ABSTRACT

An optical scanning device is provided for producing a multiple line scan. A rotating refractive scanning prism in the form of a polygonal solid having an even number of revolving opposite parallel faces provides a multiple line scan, the lines being separated because the plane parallel pairs of revolving opposite faces are at a small angle to the rotating axis of the prism, which rotating axis is generally perpendicular to the optical axis. The number of lines scanned in such an arrangement is equal to the number of revolving faces on the polygon, and can be increased, in another embodiment of the invention, by providing a plurality of detectors in an array to produce a line raster having a number of lines equal to the number of detectors times the number of revolving sides of the polygon.

2 Claims, 2 Drawing Figures

PATENTED JUL 17 1973 3,746,421

INVENTOR.
JOHN R. YODER
BY Joseph Levinson

MULTIPLE LINE ROTATING POLYGON

BACKGROUND OF THE INVENTION

Refractive scanning prisms have been utilized in the prior art for high-speed scanning applications such as photography, film editing, aerial reconnaisance, and many others where it is desirable to determine the amount of electromagnetic radiation in a given field of view in a very short period of time. One such scanner is shown in U.S. Pat. No. 3,253,498 entitled "Scanning Mechanism for Electro-Magnetic Radiation." The scanning mechanism utilizes a rotating refractive prism for scanning a line in a field of view and applying incoming radiation onto a detector which is sensitive thereto. In order to obtain a multiple line raster or rectangular scan pattern, other means must be utilized, for example, an auxiliary nutating mirror in the collecting optics, which requires auxiliary elements in the form of the nutating mirror as well as additional elements for driving the mirror scan and the synchronizing of the two scans in order to form a proper raster. Another method cited in the aforesaid patent is to progressively tilt the rotating axis of the prism as it rotates, which again requires additional elements for providing such tilt and synchronizing it with the rotation rate.

SUMMARY OF THE INVENTION

Accordingly, it is an object of the present invention to provide an optical scanning device for producing a multiple line scan in the absence of auxiliary devices.

A further object of this invention is to provide an improved optical scanning device in which a rotating refractive prism is moved in only one direction with respect to the optical axis of the system.

Another object of this invention is to provide an improved optical scanning device for providing a multiline raster-type scan where the number of lines scanned depends on the number of revolving faces of the rotating refractive prism and the number of detector elements utilized.

In carrying out these and other objects of this invention in one illustrative embodiment thereof, a rotating refractive prism in the form of a polygonal solid having an equal number of opposite parallel faces is provided, with each pair of opposite parallel faces of the polygon being tilted at a different angle with respect to the axis of rotation of the refractive prism. The number of lines scanned is equal to the number of revolving faces on the refractive rotating polygon. In a further embodiment, the number of lines scanned is increased by increasing the number of detectors receiving radiation through the rotating refracting prism.

DESCRIPTION OF THE PREFERRED EMBODIMENTS

Figure 1:
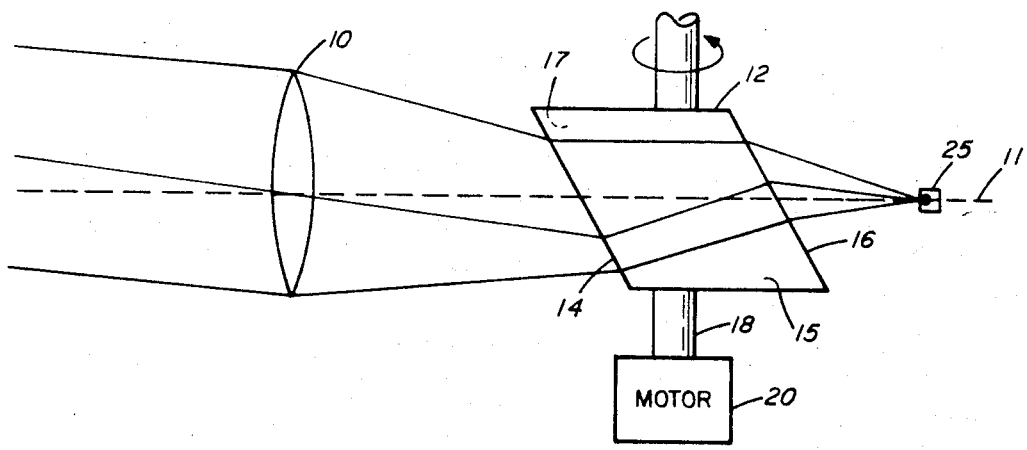
FIG. 1 is an optical schematic diagram of the scanning mechanism embodied in this invention, illustrating one scanning position.

Referring now to FIG. 1, the basic elements of the optical scanning device in accordance with this invention comprise an optical means 10, a rotating refractive scanning prism 12, and a detector means 25. The optical means 10 is illustrated as an objective lens which images a field of view through the refractive prism 12 onto the detector 25. It will be apparent that the optical means 10 for collecting the radiation from the field of view may be a totally reflective system, or catoptric, as well as the dioptric system shown. The rotating refractive prism 12 is in the form of a polygon having an equal number of opposite parallel faces. For illustrative purposes, a four-surface polygon is shown having plane parallel pairs of opposite faces 14 and 16, and 15 and 17 respectively. The prism 12 is rotated on a shaft 18 driven by motor 20. The material of the prism must be capable of passing the electromagnetic radiation which is to be measured by the detector means 25. For example, for infrared radiation, silicon or germanium may be utilized. Likewise, the detector means 25 must be capable of responding to the intensity of the electromagnetic radiation which is to be measured, and further must have a time constant sufficiently short to respond to the radiation applied in accordance with the speed of rotation of the refractive prism 12.

Figure 2:
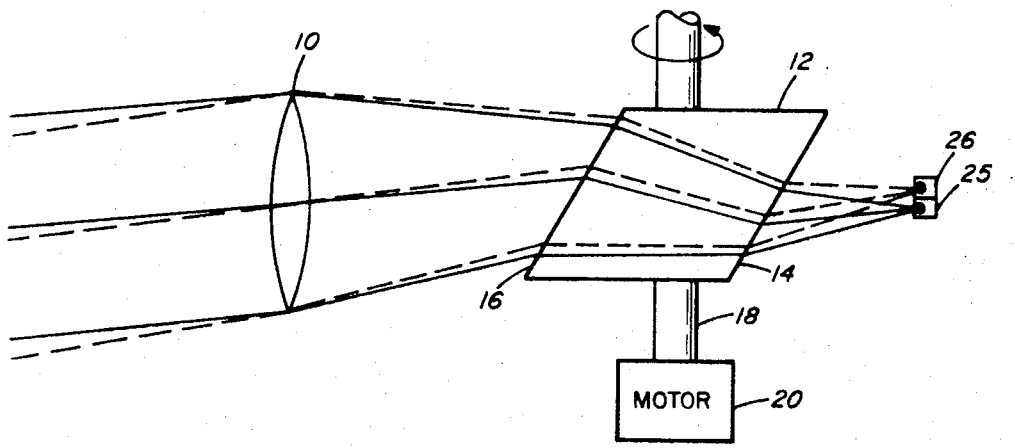
FIG. 2 is an optical schematic diagram of the scanning mechanism shown in FIG. 1 at a scan position 180° from that of FIG. 1, and additionally illustrates the use of a plurality of detectors in the scanning system.

A rectangular raster or scan pattern is provided by the refractive prism 12 by tilting the plane parallel pairs of revolving opposite faces 14 and 16, and 15 and 17 respectively, so that they remain parallel to each other, but are at a small angle to the rotating axis of the refractive prism 12. The axis of rotation of the rpism is orthogonal to the optical axis 11 of the optical system. The tilt, or angle on the faces of the prism 12 produce a sidewise displacement of the scanned line from the field of view. FIG. 1 shows the faces 14 and 16 of the prism 12 producing one scan line. When the rotating polygon, or refractive prism 12 has moved 180° as shown in FIG. 2, a scan line is produced having an equal sidewise displacement in the opposite direction. It is thus apparent that each pair of plane parallel surfaces of the scanning prism provides a pair of scanned lines equally displaced from an undeviated scanned line illustrated by the optical axis 11. If several of the face pairs of the polygon 12 are tilted by different angles from the rotating axis, a group of laterally displaced ines is produced. For example, for the four-sided scanning polygon 12 as shown in FIG. 1, having one surface pair of faces 14 and 16 tilted by one unit and the other pair of surfaces 15 and 17 tilted by three units, produces a raster of four evenly spaced lines. The vertical location of the lines would in sequence be +3, +1, −3, −1 units from the center of the raster scan. It is apparent that the number of lines scanned is equal to the number of revolving faces on the refractive prism or polygon 12. The same would hold true for 6, 8, or larger sized polygons, with the only requirement being that an even number of revolving opposite parallel faces be provided, and the angle of tilt be equally spaced with respect to the number of pairs employed. The equal spacing of the lines provides better resolution of the field of view than an unequal spacing of lines of the same field. It should be noted that the rectangular scan pattern or raster is produced without the use of any mechanism other than the rotating refractive prism 12.

Another way of producing a greater number of lines with the rotating scanning polygon is by utilizing a muliple detector array. FIG. 2 illustrates such an array, with an additional detector means 26. As will be seen by the dotted lines from the field of view which are imaged on the detector 26 by the optical means 10 and through the refractive prism 12, a different line in the field of view is seen by the detector 26 than that seen by detector 25. By thus providing a linear detector array with the multifaceted polygon 12, a raster is produced whose number of lines scanned is the number of detector elements times the number of revolving sides on the polygon. The provision for the additional scanning provides better resolution.

The output from the detector means, whether it be a single detector 25 or a multiple detector array as illustrated by detectors 25 and 26, may be processed and applied to a cathode ray tube for presenting a visual image of the scanned field of view. The tracing of the raster pattern on the cathode ray tube may be controlled by synchronizing the scanning of the cathode ray tube with the rotation of the prism, by providing a synchronizing pickup on the rotating prism from which horizontal and vertical sync pulses are derived and fed to the deflection plates of the cathode ray tube. In a single detector system the scan pattern will be in sequence from one face of the polygon to the next. With a multiple detector array, it will be understood that the scan pattern may be interlaced with, for example, all the lines from one detector being traced, then all the lines from the next, etc., or one line from one detector, one from the next detector, etc. Although a cathode ray tube display is described, other forms of display or storage may be utilized.

The fact that the present invention requires no auxiliary equipment or devices for obtaining a multiple line scanned pattern suggests a number of applications for the system, such as to produce a search or acquisition scan pattern, or to produce a homing or tracking scan pattern. Also, a thermal image of a field of view may be provided with a rather coarse resolution, but in combination with a detector array of a modest number of elements to scan a thermal image of a field of view with fairly good resolution.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

I claim:

1. An optical scanning device for producing a multiple line scan in the absence of auxiliary devices comprising
   a. a rotating refractive prism having a polygonal cross-section orthogonal to the axis of rotation with multiple pairs of opposite parallel faces,
   b. optical focusing means for applying radiation from a field of view to said refractive prism,
   c. detector means in the focal plane of said optical focusing means for receiving radiation passed by said refractive prism and developing a signal in response to the intensity of said radiation,
   d. means for rotating said refractive prism about an an axis of rotation orthogonal to and intersecting the optical axis of said optical focusing means so that multiple pairs of opposite parallel faces of said prism are revolved about said axis of rotation,
   e. each pair of opposite parallel faces of said prism being tilted at a different angle with said axis of rotation of said refractive prism thereby producing a scan of the field of view in the form of a plurality of laterally displaced lines, the number of which corresponds to the number of revolving opposite parallel faces on said prism.

2. The optical scanning device set forth in claim 1 wherein said detector means comprises a plurality of detectors arranged in a linear array parallel to said axis of rotation whereby the field of view is scanned to produce a number of lines equal to the number of revolving faces of said prism times the number of said detectors in said array.

* * * * *